United States Patent [19]

Matsumoto

[11] 3,771,082
[45] Nov. 6, 1973

[54] COPYING APPARATUS WITH AUXILIARY LIGHT SOURCE FOR ILLUMINATING AN ORIGINAL TO BE REPRODUCED

[75] Inventor: Seiji Matsumoto, Asaka-shi, Saitama-ken, Japan

[73] Assignee: Xerox Corporation, Stamford, Conn.

[22] Filed: Jan. 3, 1972

[21] Appl. No.: 214,634

[52] U.S. Cl. .................................. 355/67, 355/133
[51] Int. Cl. .......................................... G03b 27/54
[58] Field of Search .................. 355/18, 43, 67, 70, 355/133

[56] References Cited
UNITED STATES PATENTS 1,820,494  8/1931  Rennick ............................... 355/70
3,240,114  3/1966  Jonker ................................. 355/20

Primary Examiner—John M. Horan
Attorney—James J. Ralabate et al.

[57] ABSTRACT

Apparatus is disclosed for use in aiding an operator to accurately position an original image to be reproduced in registration with the aperture and transparent platen in an image reproducing system. The disclosed apparatus includes an auxiliary light source which is disposed in a position outside the aperture and apart from the path of projection of the optical system of the reproducing apparatus and illumination from the auxiliary light source is directed onto an area of the original to indicate the relative positioning between the original and the image reproducing system.

7 Claims, 5 Drawing Figures

PATENTED NOV 6 1973

3,771,082

COPYING APPARATUS WITH AUXILIARY LIGHT SOURCE FOR ILLUMINATING AN ORIGINAL TO BE REPRODUCED

BACKGROUND OF THE INVENTION

This invention relates generally to reproducing apparatus and more particularly to an arrangment for correctly positioning an original to be reproduced in registration with the optical system of the reproducing apparatus.

In copying or reproducing apparatus in which copies of an original are produced from an opaque support or one with extremely low light transmittance like thick paper or flat board, high quality copies are generated by employing an optical system which projects reflected light patterns of the original onto the surface of a photosensitive medium.

Many copying and reproducing arrangements which are commercially available contemplate the original being placed face down on a transparent platen facing the optical system of the machine to expose the photosensitive medium. Since the light reflected by the original is utilized in forming the image on the photosensitive medium, both the optical system and the light source for illumination should preferably be arranged on the same side relative to the original. However, the positioning of an original facing down in accurate registration with the platen and optical system in many cases is rather difficult.

In the reproduction of a reflective original in such systems, it is also oftentimes desirable that only a selected portion of the original be copied. In such instances, the use of optical view finders have been employed in order to secure accurate registration or positioning of the original relative to the optical system of the reproducing apparatus. However, such arrangements heretofore have resulted in undue complexity and enlargement of the copying or reproducing apparatus.

Where images are produced by electrophotography, illumination of high intensity is usually required due to the relatively low light sensitivity of the light sensitive materials generally employed. In such systems the optical portion of the apparatus is generally large and complex and any direct observation of the portion of the original exposed is therefore quite difficult. Since in many such copying machines the illumination source is arranged near the front surface of the original, this has the affect of further hindering direct observation of the original. In applications in which only a part of the original is to be copied or reproduced, or when the size of the original is larger than that of the exposure window or platen of the reproducing apparatus, accurate registration between the original and the support platen and optical system of the reproducing apparatus is especially difficult to obtain.

SUMMARY OF THE INVENTION

Accordingly, it is a principal object of the present invention to provide a device which is equipped with an original support platen on which an original is placed with its front surface down, and which enables easy and accurate registration of an original with the support platen and optical system of the reproducing apparatus.

These and other objects of the invention are attained in a copying or reproducing apparatus by means of an auxiliary light source positioned outside the aperture of the optical system of the machine such as to prevent the illumination therefrom from passing through said projection aperture to illuminate the original as it approaches the platen so that the operator can readily identify the optical image of the original reflected by the transparent platen surface to insure easy and accurate positioning thereof.

Other objects of the invention will become readily apparent to those skilled in the art in view of the following detailed disclosure and description thereof, especially when read in conjunction with the accompanying drawings.

DESCRIPTION OF THE PREFERRED EMBODIMENTS

Figure 1:
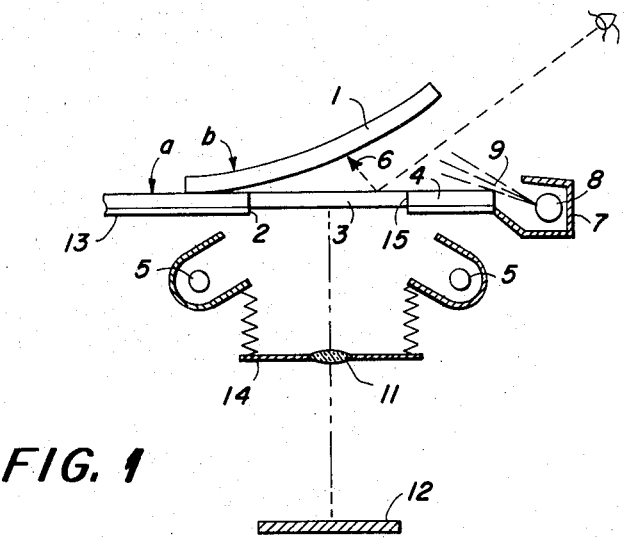
FIG. 1 is a schematic cross sectional illustration of a portion of a reproducing apparatus showing one embodiment as contemplated by the present invention.

Referring now to the drawings, an original image 1 is placed on a support platen "a" with its printed surface down. A projection aperture 2 is covered by a transparent plate 3 such as glass. The platen "a" comprises 2, 3 and 4 which is a frame or masking portion except the aperture 2. Principal light sources 5 are provided beneath the platen and a projection lens 11 focuses the reflected light from the original onto a light-sensitive material 12.

An operator holds an edge, for example "b", of the original 1 on the platen "a" and arranges it so that the desired portion of the original is just included in the aperture 2. During this operation, the operator must observe the mirror image of the printed surface which is reflected onto plate 3. The thus reflected image is rather dark and hard to see since the original receives a very small quantity of light from the surroundings.

To resolve this difficulty, an auxiliary light source 8 is provided in a light box 7 attached adjacent to, and in approximately the same plane as, the platen "a" so as to illuminate the printed surface of the original as it is placed close to the platen. The light box 7 is so designed that the light from lamp 8 effectively illuminates only the printed surface of the original with as little leaking flux as possible. In the arrangement shown, particular care is given so as to not give rise to light flux directed toward the operator's eyes.

By the aid of the auxiliary light source 8, the operator can see a bright illuminated image of the original, reflected by the transparent plate 3 on the aperture 2 as shown by the dotted line 6 and thus can easily arrange the original at the desired position.

In spite of the low reflectance of the transparent plate 3 comprising the aperture 2, the operator can see a bright reflected image of the original which is irradiated by the light from the auxiliary light source 8. During the positioning operation of the original 1, the principal light source 5 is deenergized. Keeping light source 5 off, the operator can view a clear image of the original since the light-tight housing 14 comprising the optical system for projection of the image onto the photosensitive medium 12 forms a dark background for the viewer 5. Although the masking portion 4 surrounding the aperture 2 of the platen "a" may be made of any opaque material, it may preferably have an upper mirror surface with a suitable high reflectance. A favorable example of the platen construction may be given by a large, single glass platen provided with an opaque mask 13 on the lower surface thereof. In this instance, the opaque mask 13 should have a black or dark appearance when viewed from above so as to avoid creating any interference with the image formed by surface reflection.

When a large, single glass plate is used for the platen "a", clearly visible white border lines 15 may be drawn on the plate so as to designate the range to be reproduced.

Figure 2:
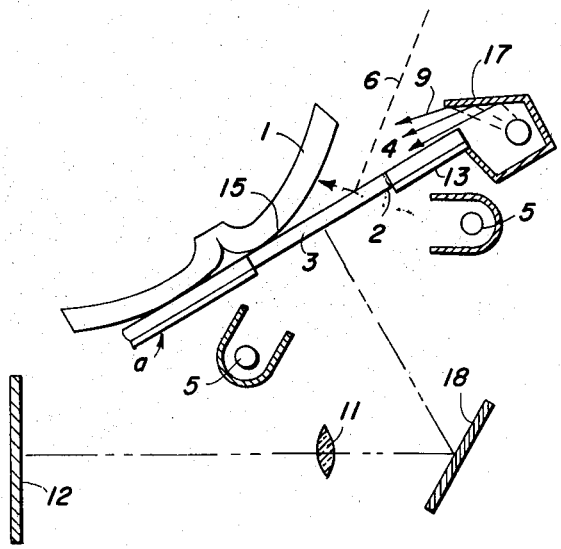
FIG. 2 is a schematic cross sectional illustration of a portion of a reproducing apparatus showing another embodiment as contemplated by the present invention.

FIG. 2 shows another embodiment of the present invention in which, the positioning of the original is made more easy by the utilization of a platen slightly inclined at an angle from the horizontal. The degree of inclination may be selected within a range preferably less than 30° whereby the original will not fall from the platen under the influence of its own weight. In this embodiment, an auxiliary light source 16 illuminates the original in cooperation with a mirror surface 17. Such arrangement thus enables the operator to view the reflected image in a natural standing position during positioning of the image. Another mirror 18 may be used in the principal optical system for the conversion of a mirror image into a right-reading image depending upon the type of copying system employed.

Figure 3:
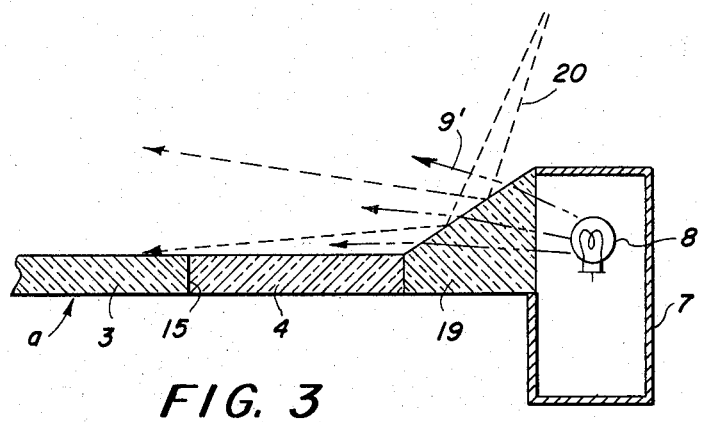
FIG. 3 is a schematic cross sectional illustration of a portion of a reproducing apparatus showing a further embodiment as contemplated by the present invention.

FIG. 3 illustrates still another example of an auxiliary light source which is utilized to illuminate an original image in still a different manner. According to this embodiment, at one edge of the suppot platen "a", a transparent block 19 is utilized. The light flux emanating from the light source 8 is transmitted through the block 19, and emerges to illuminate the printed surface of the original image as it is placed onto the platen. This arrangement has the advantage that there are no openings adjacent the auxiliary light source which may tend to interfere with the original during the positioning operation. Further, the operator can see a clear reflection image of the printed surface of the original on the inclined plane of the block 19, and can easily identify the relative positioning between the printed matter and the border line 15.

Figure 4:
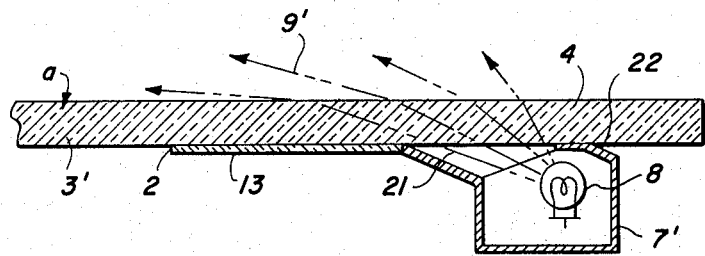
FIG. 4 is a schematic cross sectional illustration of a portion of a reproducing apparatus showing still another embodiment as contemplated by the present invention.

FIG. 4 illustrates still another arrangement of an auxiliary light source. In this example, the auxiliary light source 8 is set under a transparent plate 3' which is common for the projection aperture 2 and the masking region 4 of the platen. The light source 8 is enclosed inside a light source housing 7' which is provided outside the projection aperture 2. In this embodiment, a transparent block 21 having a triangularly shaped section is employed so that light flux from light source 8 is effectively transmitted throughout the platen 3'. An opaque masking layer 13 extends from the housing 7' to define an exposure aperture and also prevents stray light from entering into the optical projection system. Another light-shielding plate designated at 22 may also be employed to prevent direct light from light source 8 from diffusing upwardly, especially in the direction toward the operator's eyes.

Figure 5:
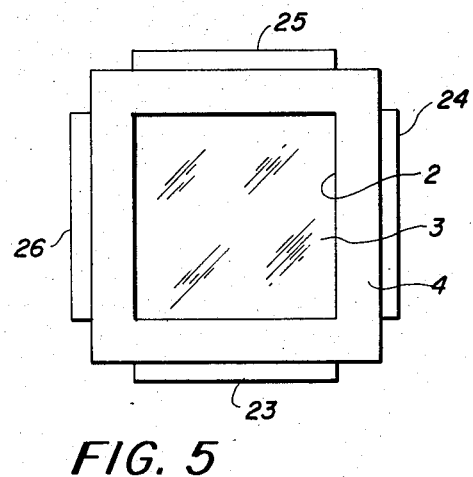
FIG. 5 is a plan view showing alternate locations for the auxiliary light sources of the embodiments of FIGS. 1-4.

FIG. 5 shows a plan view of one practical example for support platen "a" for originals, which comprises an aperture for projection 2, and a mask 4. On such support an original may be superimposed with its printed surface facing down. Reference numerals 23, 24, 25 and 26 show locations whereat auxiliary light source or sources 8 may suitably be located. If an operator normally stands facing the side 23, the light source 8 may be installed at the position 23. However with this arrangement, the auxiliary source 8 may also be located at locations 24 and 26 with excellent results. If the reproducing apparatus is such that an operator may easily take any of the positions from 23 to 26, each side of platen "a" may be equipped with a light source 8 and any necessary unit may be selectively energized.

As will be understood from the foregoing description, the positioning of a downward-facing opaque original can be carried out in accurate registration with the platen of a copying or reproducing apparatus with the aid of an auxiliary illuminating means as contemplated by the invention.

While the invention has been described with reference to preferred arrangements and embodiments, it will be generally understood by those skilled in the art that various changes may be made and equivalents may be substituted for elements thereof without departing from the true spirit and scope of the invention.

What is claimed is:

1. In a reproducing apparatus in which an original to be reproduced is placed on a transparent platen overlying a projection aperture and illuminated by a principle light source to project a reflected information pattern of the original through an optical system onto the surface of a photosensitive material, apparatus for aiding an operator in accurately positioning the original in registration with the aperture and transparent platen, the improvement comprising:

an auxiliary illumination means supported adjacent to, and in approximately the same plane as, said transparent platen for illuminating at least a portion of the information pattern on the original during placement of the original onto said transparent platen, and reflecting an image of said information pattern onto said transparent platen, said auxiliary illumination means mounted such as to prevent the illumination therefrom from passing through said projection aperture, and means for energizing said auxiliary illumination means independently of the energization of said principle light source, whereby an operator may view on said platen an image of the original to be reproduced and accurately position the original in registration with the aperture and said platen before making a reproduction of the original.

2. The apparatus of claim 1, wherein optical means is operatively associated with said auxiliary illumination means directing at least a portion of the illumination from said auxiliary illumination means onto the surface of the original to be reproduced.

3. The apparatus of claim 2, wherein said optical means is a mirror surface.

4. The apparatus of claim 2, wherein said optical means is a transparent block.

5. The apparatus of claim 4, wherein said transparent block is an extension of said transparent platen.

6. In a reproducing apparatus in which an original to be reproduced is placed on a transparent platen overlying a projection aperture and illuminated by a principle light source to project a reflected information pattern of the original through an optical system onto the surface of a photosensitive material, apparatus for aiding an operator in accurately positioning the original in registration with the aperture and transparent platen, the improvement comprising:

an auxiliary light source supported adjacent to, and in approximately the same plane as, said transparent platen for illuminating at least a portion of the information pattern on the original during placement of the original onto said transparent platen, and reflecting an image of said information pattern onto said transparent platen, said auxiliary light source mounted so as to prevent the illumination therefrom from passing through said projection aperture, and means for energizing said auxiliary light source independently of the energization of said principle light source, whereby an operator may view on said platen an image of the original to be reproduced and accurately position the original in registration with the aperture and said platen before making a reproduction of the original.

7. The apparatus of claim 6, wherein optical means is operatively associated with said auxiliary light source for directing at least a portion of the illumination from said auxiliary light source onto the surface of the original to be reproduced.

* * * * *